Sept. 28, 1954   W. F. MILLER ET AL   2,690,040
ELEVATING AND DEPRESSING MECHANISM FOR MOWERS
Original Filed May 18, 1951   3 Sheets-Sheet 1
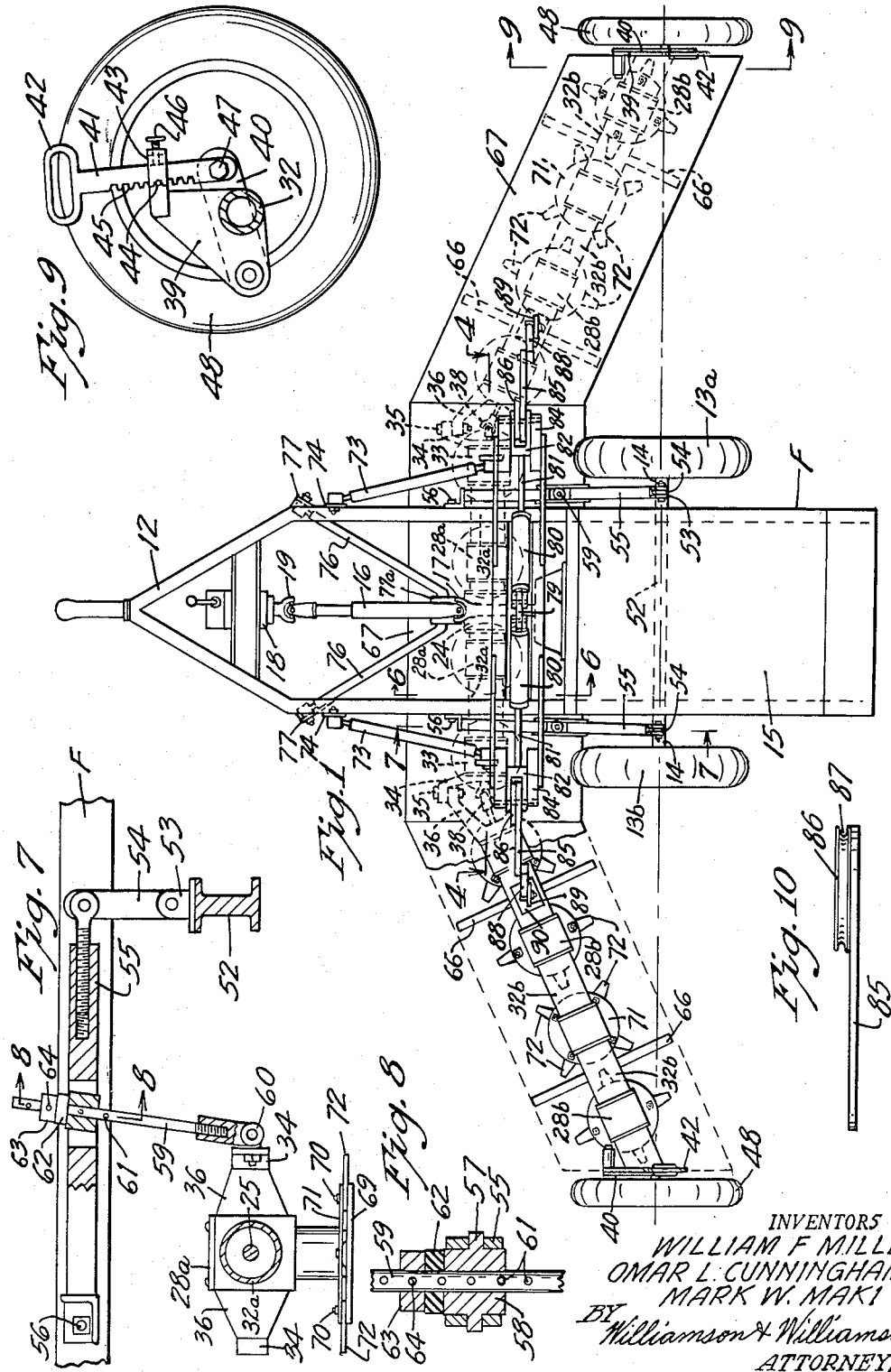
INVENTORS
WILLIAM F. MILLER
OMAR L. CUNNINGHAM
MARK W. MAKI
BY Williamson & Williamson
ATTORNEYS.

Sept. 28, 1954   W. F. MILLER ET AL   2,690,040
ELEVATING AND DEPRESSING MECHANISM FOR MOWERS
Original Filed May 18, 1951   3 Sheets-Sheet 2
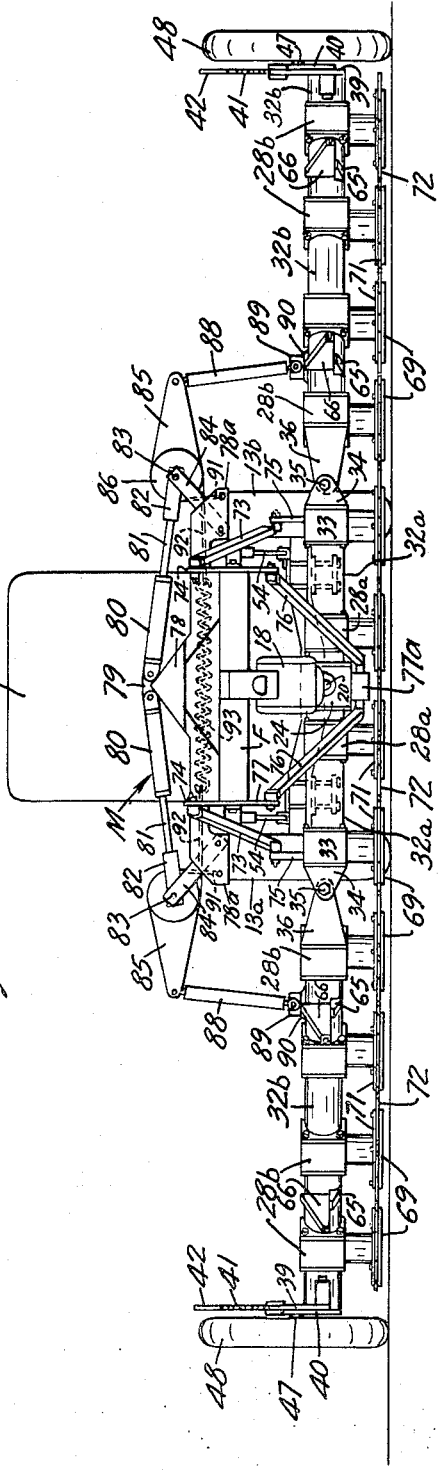
INVENTORS
WILLIAM F. MILLER
OMAR L. CUNNINGHAM
MARK W. MAKI
BY Williamson & Williamson
ATTORNEYS Sept. 28, 1954  W. F. MILLER ET AL  2,690,040
ELEVATING AND DEPRESSING MECHANISM FOR MOWERS
Original Filed May 18, 1951  3 Sheets-Sheet 3
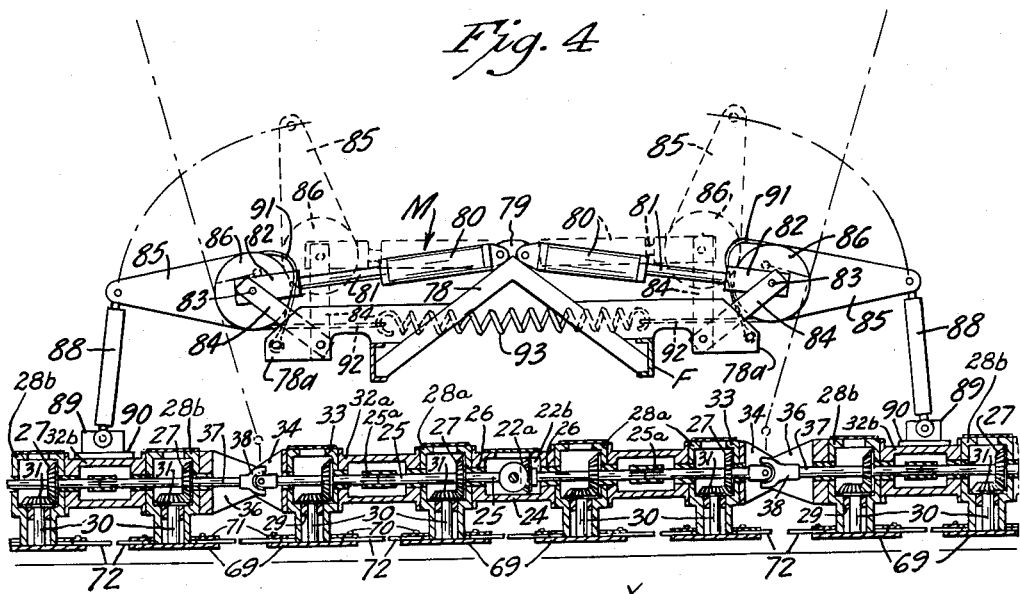
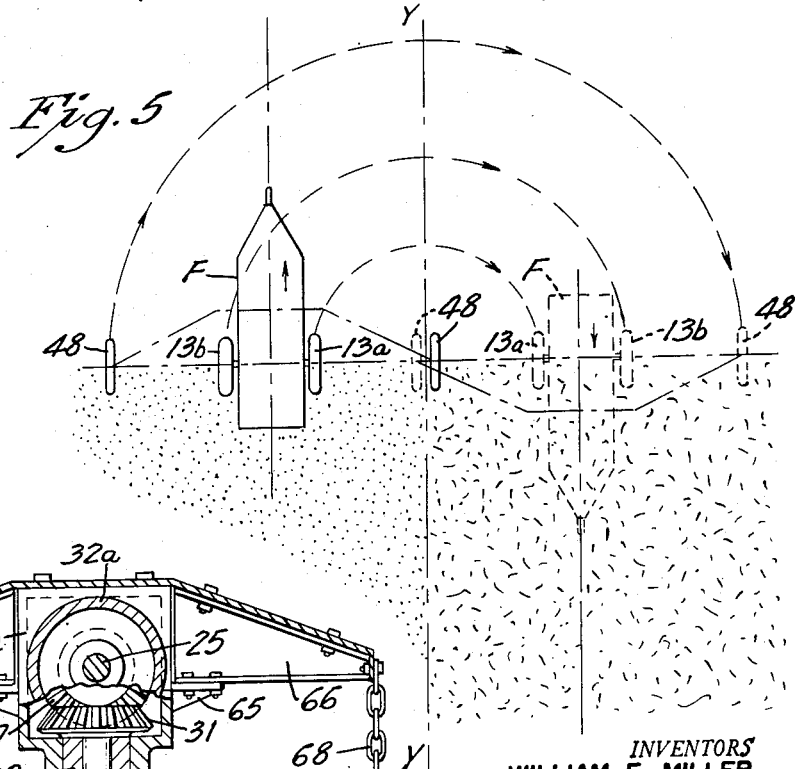
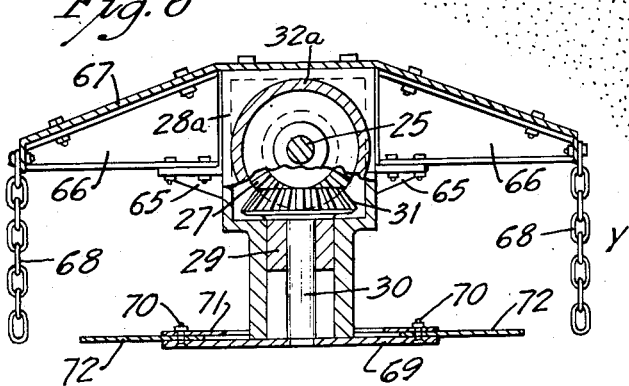
INVENTORS
WILLIAM F. MILLER
OMAR L. CUNNINGHAM
MARK W. MAKI Patented Sept. 28, 1954

2,690,040

UNITED STATES PATENT OFFICE 2,690,040

ELEVATING AND DEPRESSING MECHANISM FOR MOWERS

William F. Miller, Omar L. Cunningham, and Mark W. Maki, Minneapolis, Minn., assignors to Toro Manufacturing Corporation of Minnesota, Minneapolis, Minn., a corporation of Minnesota Original application May 18, 1951, Serial No. 227,064. Divided and this application May 21, 1951, Serial No. 227,442

9 Claims. (Cl. 56—6)

This invention relates to rotary mowers. More particularly it relates to rotary mowers constructed for wide-swathed mowing generally at relatively high speeds and wherein 180° turns are made at the end of the area being mown.

Current requirements in mowing large areas such as air ports, golf courses, and the like specify that a rotary mower, utilized for such areas, should be capable of executing a 180° turn without skipping or leaving any unmown area between the adjacent swathes in the vicinity where the turning operation takes place. Such a rotary mower should, for efficient operation, be capable of cutting a wide swathe and of being operated at high speeds. It is imperative that there be no skidding of the weight-bearing wheels during such a turning operation to prevent the sod or turf from being torn and damaged. It is equally important that some means be provided to prevent serious bouncing of the mower while passing over relatively rough terrain at high speed. It is also imperative that some means be provided for either quickly substituting other blades for cutting blades which have become dulled or for preventing such blades from becoming dull to thereby minimize the loss of time required for changing blades. Our invention is directed toward a satisfactory solution of these problems. The inventions disclosed and not claimed herein are also disclosed in our divisional application Serial No. 227,064, filed May 18, 1951, and entitled "Multirotor Mower" and are claimed therein.

It is a general object of our invention to provide a novel and improved rotary mower of relatively simple construction and of increased efficiency when in operation.

A more specific object is to provide a novel and improved mower utilizing a plurality of rotary cutter units mounted on spaced vertical axes and capable of completing a 180° turn without skipping any of the grass and/or weeds between swathes and without lateral skidding of the wheels with consequent injury to the mown surface and with excessive wear upon the tires.

Another object is to provide a rotary mower having a plurality of rotary cutter units mounted in a sweep arrangement to cut a continuous swathe the ends of which meet the axis of the wheel structure upon which the mower turns and the main portion of which extends or lies to one side of such axis.

Another object is to provide a novel and improved mechanism for maintaining the respective sections of a multi-rotor mower in contact with the ground at all times despite the passage thereof over rough terrain.

Another object is to provide a rotary mower constructed to float with the contour of the surface to be mowed and to permit sections thereof to pivot vertically with respect to each other while passing over uneven terrain.

Another object is to provide a novel and improved rotary mower portions of which are swingable vertically to an out-of-way position and having novel and improved elevating mechanism for accomplishing such movement.

Another object is to provide a rotary mower having a plurality of rotary cutter unit assemblies capable of ready vertical adjustment with respect to the surface to be mowed.

These and other objects and advantages of our invention will be more apparent from the following description made in connection with the accompanying drawings, wherein like reference characters refer to similar parts throughout the several views and in which:

Fig. 1 is a top plan view of one embodiment of our invention with a portion of the cowl broken away from one of the lateral cutter unit assemblies.

Fig. 2 is a front elevational view of the same with the cowl and protective guard removed to more clearly show the respective cutter units.

Fig. 3 is a side elevational view of one embodiment of our invention with the lateral extending assemblies broken away to more clearly show the relation between the remaining parts.

Fig. 4 is an enlarged front elevational view taken approximately along line 4—4 of Fig. 1.

Fig. 5 is a diagrammatic view showing the exact path followed by the supporting structure for an embodiment of our invention in executing a 180° turn without skipping or skidding.

Fig. 6 is an enlarged vertical sectional view taken approximately along line 6—6 of Fig. 1.

Fig. 7 is an enlarged elevational view taken approximately along line 7—7 of Fig. 1 with the necessary parts broken away to provide such a view.

Fig. 8 is an enlarged sectional view taken along line 8—8 of Fig. 7.

Fig. 9 is an enlarged elevational view taken approximately along line 9—9 of Fig. 1.

Fig. 10 is an elevational view showing the details of and the relation between the lever arm of the elevating mechanism and its disc or drum.

One embodiment of our invention may include, as seen in Figs. 1–10, an ambulant frame indicated generally as F, the forward end 12 of which may be supported by a tractor or other propelling device and the rearward end of which may be supported by wheels 13a and 13b mounted on an axle 14 which extends transversely to the frame F and to the direction of its movement. If desired, of course, the frame F may be provided with a propelling mechanism of its own and in that event a set of wheels adjacent the forward end thereof would normally be required.

As shown, a motor 15 is mounted upon the ambulant frame F to provide a source of rotary power. A primary drive shaft 16 is connected to the motor 15 by universal joint 17 and to transmission gear (not shown) in a transmission housing 18 by a second universal joint 19. These transmission gears (not shown) in a transmission and arranged to step up the speed of the rotary motion created by the motor 15 and to make possible a reversal in the direction thereof. A secondary drive shaft 20 is likewise connected to these transmission gears by a universal joint 21 and to bevel gear 22a by a fourth universal joint 23. As best shown in Fig. 4 this bevel gear 22a is housed in a gear box 24 which is disposed directly beneath the frame F. This bevel gear 22a cooperates with another bevel gear 22b which is mounted on a horizontal and transversely extending splined shaft 25.

The splined shaft 25 extends laterally in both directions through the sides of the gear box 24 which has bearings 26 for that purpose. This shaft is made in sections, each section being splined to another section by splines 25a to increase the length of the shaft. The splined shaft 25 extends through the bearings 26 and carries bevel gears 27 at regular intervals along its length. Each of these bevel gears 27 is disposed within a gear box 28a. The lower portion of each gear box 28a is constructed to provide a journal 29 for a vertically extending and depending shaft 30 which carries a horizontally arranged bevel gear 31 in position to cooperate with the bevel gear 27. Each gear box 28a is open at both its sides and is adapted thereat to be removably connected to relatively long housing segments 32a. These housing segments 32a carry the splined shaft 25 and serve to support the next gear box 28a which may be connected to the outer end thereof.

As best shown in Fig. 2 a gear box 33 is rigidly connected to the outer end of each of the longer housing segments 32a. This gear box 33 is formed quite similarly to the gear boxes 28a but is provided with an outwardly extending bracket 34 on its outer side. As best shown in Fig. 1 this bracket 34 is provided with a pair of pivot rods 35 at the ends of each of its arms.

Pivotally mounted on the pivot rods 35 is an angled pivot bracket 36. As best seen in Fig. 1 the angle of this pivot bracket 36 is such as to cause other gear boxes 28b and housings 32b which may be connected thereto and which are constructed similarly to the gear boxes 28a and housings 32a to extend rearwardly with respect to the frame F. The bracket 34 and the pivot rods 35 are arranged so that the angled pivot bracket 36 is mounted for swinging movement on a horizontal axis extending longitudinally of the frame F and in the general direction of movement of that frame. The splined shaft 25 is connected in driving relation to a similarly splined shaft 37 by a universal joint 38. It can be readily seen that a gear box 28b may be rigidly connected to the outer end of the angled bracket 36 and that a housing 32b may be connected to the outer side of such gear box and that additional boxes 28b and housings 32b may be connected in alternating sequence until the length of such an assembly is as great as may be desired. Each of these gear boxes 28b has a vertical shaft 30b mounted for rotation and each is adapted to be connected to such a housing 32b. By referring to Fig. 1 it can readily be seen that this results in a sweep back arrangement with respect to the frame F.

The final or outermost housing 32b on each side of the machine has a right triangled plate 39 secured to its outer side by welding or some other suitable means. A link 40, as best shown in Fig. 9 is pivotally connected to the forwardmost corner of this plate 39 and extends rearwardly therefrom. A ratchet arm 41 with a handle 42 extends upwardly from the rear end of the link 40 to which it is pivotally connected and passes through a guide member 43 which has a slot therein for that purpose. This guide member 43 is welded to the upper corner of the plate 39 and has a transversely extending pin 44 extending therethrough to cooperate with the teeth 45 of the ratchet arm 41. The set screw 46 extents inwardly through the guide member 43 and into its slot to abut against the rear of the ratchet arm 41. An axle 47 is mounted on the outer side of the rear end of the link 40 and carries a supporting wheel 48 on the outer end thereof.

Mounted on the ambulant frame F and depending therefrom are four mounting plates 49 each of which is mounted on the opposite sides of the frame in longitudinally spaced relation. Pivotally connected to the lower portions of each of the forwardmost two of these plates 49 is a spring 50. The rear end of each of the springs 50 is connected to its respective rear plate 49 by a link 51 for swinging movement therebetween. The medial portion of the axle 14 is constructed in the shape of an I beam, as best shown at 52 in Fig. 3. This I beam is rigidly connected to the spring 50 by clamps or other suitable means. Thus the entire frame F is supported by the wheels 13, its axle 14, the springs 50 and their mounting plates 49. Formed on the upper surface of the I beam adjacent each side of the frame F is an upstanding bracket 53 which is pivotally connected by a link 54 to the rear end of a lever arm 55 as best shown in Fig. 7. The forward end of each lever arm 55 is pivotally mounted on the frame F as at 56.

Pivotally mounted within the interior of each lever arm 55 by means of a pair of ears 57 is a pivot block 58. The ears 57 are arranged so that the pivot block will pivot on a substantially horizontal and transverse axis with respect to the frame F. A suspension arm 59 is pivotally connected at its lower end as at 60 to the housing directly below and extends upwardly through the pivot block 58 a substantial distance. Spacing holes 61 are formed in the upper portion thereof. A rubber bumper or cushion 62 and a collar 63 are slid over the upper end of each suspension arm 59 as shown in Fig. 7 and a lock pin 64 is provided to lock each collar to its suspension arm in the spacing hole selected for that purpose. Formed integrally with some of the housings 32b is an upfacing bracket 65. As best shown in Fig. 6 triangularly shaped support arms 66 may be secured to these brackets. Secured to the support arms in superimposed relation is a cowl 67 which extends throughout the length of the cutter assemblies. Depending from the forward and rearward edge of the cowl 67 are a plurality of closely spaced lengths of chain 68 which extend to a point a short distance above the surface to be mowed.

Removably secured to the lower end portion of each of the shafts 30 and 30b as best shown in Fig. 6 is a horizontal disc 69. These discs 69 are connected by vertically extending pivots 70 to a spaced collar disc 71. Mounted on each of the pivots 70 in free swinging relation is a generally triangularly shaped cutter element or knife 72. These knives 72 are sharpened along both of the side edges and are pivoted at the base of the triangle so that when the disc 69 and the collar 71 rotate rapidly, the blades will extend radially therefrom and the forward and the trailing edge thereof will be sharp.

As best shown in Figs. 2 and 3 a bracing structure having the general shape of a parallelogram is provided for maintaining the cutter elements in a substantially horizontal position. This bracing structure includes along each side of the frame F a pair of vertically spaced parallel bracing arms, the upper one 73 of which is pivotally secured to the frame F with a plate 74. This upper bracing arm extends diagonally downwardly and outwardly and is pivotally connected at the lower end to an ear 75 on the top of the gear box 28 disposed immediately inwardly of the bracket 34. This is best shown in Fig. 2. The lower 76 of these parallel arms extends downwardly and inwardly and is pivotally connected to the frame F at its upper end by a plate 77 which depends from the frame F. The lower end of the bracing arm 76 is pivotally connected to the lower side of the gear box 24 by a horizontally and forwardly extending pivot bracket 77a.

Wherever herein the term rotary cutter unit is used it is intended to refer to a gear box 28, 28b or 33 in conjunction with its vertical shaft 30 or 30b, the disc 69, the collar disc 71 and the cutter elements 72. Wherever the term rotary cutter unit assembly is used herein it is intended to connote a plurality of such rotary cutter units connected together into an assembly movable as a single unit. Thus the plurality of rotary cutter units extending laterally from each of the brackets 34 are considered to constitute a lateral extending rotary cutter unit assembly and the plurality of rotary cutter units connected together between the brackets 34 are considered to constitute a centrally and transversely disposed cutter unit assembly.

The cutter elements of the respective rotary cutter units are synchronized with those of the adjacent cutter unit and the units are arranged closely enough together so that the cutter elements overlap. The outermost of the cutter units of each lateral assembly is disposed so that its cutter elements at least intersects the axis of its respective supporting wheel structure adjacent the outermost wheel 48. This is best shown in Fig. 1.

To facilitate the passage of our rotary mower through gates and other relatively narrow passages and to insure that the respective cutter assemblies will be prevented from bouncing while passing over rough terrain at relatively high speeds, we have provided a combined elevating and depressing mechanism to be used in conjunction with these assemblies. This mechanism has been indicated generally as M and may include as shown a pair of longitudinally spaced inverted V-shaped supports 78, with horizontal arms 78a mounted on top of the frame and extending laterally therefrom. A pivot member 79 is provided and secured at the apex of the V and upon this pivot member is pivotally mounted a pair of oppositely extending hydraulic cylinders 80. These cylinders together may be considered to constitute a hydraulic cylinder assembly and each of them is provided with a piston (not shown) which has a piston rod 81 extending outwardly therefrom. As best shown in Fig. 2 these cylinders 80 are arranged so that the piston rods 81 will extend laterally with respect to the frame F. Each of the rods 81 is provided with a U-shaped bracket 82 at its outer end and this bracket is pivotally connected to a horizontally extending pivot shaft or pin 83 which extends through a pair of spaced pivot arms 84. These pivot arms 84 are pivotally mounted at their lower ends on their respective horizontal support arms 78a. The cylinders 80 are supplied by the motor 15 with a source of hydraulic power.

Pivotally mounted on each horizontal pivot pin or shaft 83 is a lever arm 85. As best shown in Fig. 2 this lever arm is mounted by one of its end portions and has a disc or drum-like structure 86 formed integrally therewith or fixedly secured thereto. This disc 86 is provided with a groove 87 in its outer circumferential surface. The outer end of each lever arm 85 is pivotally connected with a lift arm 88 which in turn is pivotally connected to an upstanding bracket 89 fixedly secured to the top of a housing 32b as at 90 at a point spaced between the ends of the lateral cutter unit assembly.

A cable 91 is anchored on the outer end portion of each of the arms 78a at a point outside of the pivot points of the lower end of the pivot arms 84. This cable 91 extends upwardly around the disc 86 and within the groove 87 and is secured in any suitable manner (not shown) to the disc itself at a point partway therearound. The cable extends in the direction in which the lever arm 85 will swing when the lateral assembly moves downwardly.

A pair of cables 92 extend outwardly from each of the ends of a relatively strong contractile type spring 93 which is disposed between the discs 86. Each of these cables 92 extend around a disc 86 in the opposite direction from the cable 91 and is fixedly secured to the disc at a point partway therearound as best shown in Fig. 4. The length of the cables 92 are such that when the lateral assemblies are lowered the spring 93 will necessarily be extended substantially. The length of the cables 91 is such that when pivot arms 84 move to vertical position the respective discs 86 will be caused to rotate about the pivot shaft 83 to cause the outer end of the lever arm 85 to swing upwardly and draw its lift arm 88 and the lateral assembly connected thereto upwardly. These cables 91 are also of such a length that when the structure is in the position shown in Fig. 2 the cables are relaxed.

*Operation.*

In operation the embodiment of our invention shown in Figs. 1–10 may be drawn behind a tractor or other propelled vehicle to accomplish the mowing function. Fig. 5 shows diagrammatically the manner in which a 180° turn will be executed with this mower without skipping of unmown areas and without skidding of the wheels supporting the mowing structure. The left hand portion of Fig. 5 shows the multi-rotor mower being drawn in the direction indicated (toward the top of the drawing) and indicates the paths followed by the respective wheels during the turning operation. The right hand wheel which is mounted adjacent the outer end of the right hand laterally extending cutter unit assembly backs up during the turning operation so that when the turn has been completed it is in the position shown in broken lines. The rest of the mower is also shown in broken lines after the turn has been completed. It can be readily seen through reference to the line Y—Y that the completion of the 180° turn results in a substantial overlap by this right hand wheel. Thus there will be absolutely no skipping of unmown areas possible in the vicinity of this right hand wheel. This obviates any requirement for additional turns or additional mowing trips across the ends of the area to be mown to insure that all of the grass and weeds which ordinarily is missed during such turns has been mown.

When a 180° turn is executed as shown in Fig. 5, each of the respective wheels completes the turn without any skidding relative to the surface being mown. This is accomplished as a direct result of each of the supporting wheels being mounted along an axis lying in the same vertical plane as the axis of the wheels supporting the frame F. Close examination of Fig. 5 will reveal that the turning point in such a turning operation is disposed immediately inside the outermost wheel on the side toward which the turn is being made. Since each of the wheels is continually maintained at all times throughout the turning operation along an axis which is in the same vertical plane as the axis of the frame supporting wheels, it is not necessary for any of the other side supporting wheels to skid or slip sideways in order to complete the turn. Thus there is no skidding or slipping of the wheels or their tires over the surface being mown. Since there is no slipping or skidding, there will be no consequent damage to the surface being mown and there will be no excessive wear on the tires mounted on the wheels executing the turn.

One important feature of our invention is the sweep back arrangement of the rotary cutter units, each of these cutter units being arranged so that the various cutter elements are synchronized and overlap with respect to each other. By arranging the rotary cutter units in a continuous line with such overlapping relation existing therebetween, it is possible to have additional supporting wheels such as the wheels 48 without the objectionable skidding and excessive wear normally encountered since such a sweep back arrangement permits each of such supporting wheels to be mounted along the same axis or at least along an axis in the same vertical plane as the axis for the frame supporting wheels. This sweep back arrangement, of course, could be varied to provide a sweep forward arrangement by placing the central rotary cutter unit assembly rearwardly of the frame supporting wheels 13a and 13b and by causing the laterally extending assemblies to extend forwardly to a point where their supporting wheels are disposed along the same axis as the wheels supporting the frame F. Thus we have provided a mower wherein a continuous wide swathe may be accomplished and wherein the mechanism for accomplishing such a wide swathe does not have the objectionable features previously found in mowers attempting to cover such wide strips.

The lever arm 55 in conjunction with the suspension arm 59 and their associated parts cooperate to provide a dampening effect with respect to the vertical movement imposed on the central cutter unit assembly as a result of the frame supporting wheels 13a and 13b passing over rough terrain. For example if one of the wheels 13a and 13b strikes a bump, the I beam 52 will move upwardly and carry the rearward end of the lever arm 55 upwardly therewith. By referring to Fig. 7 it will be readily seen that the central cutter unit assembly will be caused to move upwardly as a direct result. The upward movement, however, is substantially reduced because the suspension arm 59 is attached at approximately the longitudinal mid-section of the lever arm 55. Thus if the rearward end of the lever arm moves upwardly one foot, the suspension arm 59 which is attached to the central rotary cutter unit assembly will be moved upwardly only approximately one half that distance.

Another result of the use of the lever arm 55 and the suspension arm 59 in conjunction with the spring 50 is that the cutter elements are urged downwardly at all times with respect to the frame while the machine is passing over a bump. When one of the wheels passes over a bump, its associated leaf spring 50 is compressed until its resistance is sufficient to bear and lift the weight of the frame. As soon as the wheel passes over the crest of the bump, the leaf spring urges the wheel downwardly. Hence, even though the frame may continue to follow the trajectory given it by the impact of the wheel upon the bump, the cutter elements will be lowered with respect to the frame to off-set such movement and minimize its undesirable consequences. In other words, the frame is indexed to the spring in such a way that when the frame rises, the cutter element is maintained at a low level because the wheel is maintained in contact with the surface of the bump at all times and hence the rearward end of the lever arm 55 is lowered in conformance with the surface over which the wheel passes.

It is possible to adjust the elevation at which the respective cutter elements are disposed above the surface to be mown. This is accomplished by removing the lock pin 64 and adjusting the cushion 62 and collar 63 so that the lock pin will extend through the spacing hole 61 located to provide the desired elevation. In this manner the elevation of the central assembly and the elevation of the inner end portions of the lateral assemblies may be adjusted. The outer end portions of the lateral assemblies may be adjusted through the adjustment of the ratchet arm 41. To accomplish this adjustment the set screw 46 is loosened and the ratchet arm 41 is drawn rearwardly by the means of the handle 42 and raised or lowered to the desired elevation whereupon the ratchet arm is again moved forwardly so that the teeth 45 may engage the pin 44. The set screw 46 is then again tightened to secure the ratchet arm in place.

Bracing structure is required to insure that the shafts 30 within the rotary cutter units are at all times maintained in substantial vertical position despite the vertical movements of the central assembly. By referring to Figs. 3 and 7 it can be readily seen that means must be provided to insure that these shafts 30 will not tilt off their vertical positions. We have provided what we choose to call a parallelogram type of bracing structure. By referring to Fig. 3 it can be readily seen that the central assembly of rotary cutter units is free to move upwardly and downwardly and that it will at all times be prevented from tilting its shafts 30 off vertical position by our novel bracing structure. In other words, since the bracing arms 73 and 76 are parallel and are pivotally connected to the central assembly, these arms will move with the assembly to maintain the same in its proper orientation and will at all times remain parallel to each other.

When the device is in the position shown in Fig. 2 the laterally extending positions of the pivot arms 84 cause the cables 92 to tension the spring 93. Since the spring pulls inwardly on the cable 92, each of the discs 86 and the lever arms 85 are urged to rotate so that the outer end portions of the lever arms will be urged downwardly to exert a depressing effect on each of the lateral assemblies. In other words, a downwardly directed pressure will be exerted through the lift arms 88 upon each of the lateral assemblies and that urge will remain constant without any pressure whatsoever being exerted by the piston rods 81 or the hydraulic assembly. This downward pressure serves the very useful function of maintaining the outer support wheels in contact with the ground at all times and thus prevents bouncing of the cutter unit assemblies and irregular, unsatisfactory mowing operations. There is a great tendency for bouncing of these cutter units while passing over rough terrain at high speeds and this depressing mechanism effectively prevents such units from such bouncing movement. As a result, the mowed surface has an even and highly satisfactory cut despite the fact that the mowing operation is performed at high speeds.

Because a mower of such wide proportions is utilized, there is need to be able to partly collapse or withdraw the laterally extending portions of the device. This is important since it is often necessary to move such a device through relatively narrow gates or other narrow passageways. It is also important to be able to elevate the cutter units a substantial distance above the ground to permit more rapid transportation of the device when not engaged in cutting or mowing operations. It is obvious, of course, that it is possible for each of the lateral assemblies to pivot vertically about the axis of the pivot pins 35 which connect the brackets 34 and 36. We have provided a combined elevating and depressing mechanism for the purpose of controlling such pivotal movement.

When it is desired to elevate the lateral assemblies, the cylinder assembly may be activated by the motor 15 to draw the pistons and their brackets 82 inwardly. By referring to Fig. 2 it can be seen that the result of this inward movement is to move the pivot shaft 83 both inwardly and upwardly. The inward movement, however, exceeds the upward movement so that the tension on the spring 93 will be relaxed. Since the upward movement of the pivot shaft 83 and its inward movement both tend to move that shaft farther away from the anchor of the cable 91, this movement results in these discs 86 being caused to rotate. The direction of this rotation is such as to cause the outer end portions of the lever arms 85 to swing upwardly, pivoting or swinging around the pivot shafts 83 so that when the pivot arms 84 have reached approximately vertical position, the lateral assemblies will have been elevated a very substantial distance. Once the lateral assemblies have been elevated, they may be maintained in this position by locking the hydraulic assembly in any well-known conventional manner.

When it is desired to again lower these lateral assemblies, the hydraulic assembly is actuated by the motor 15 to cause the piston rods 81 to move outwardly. This outward movement will gradually permit the lowering of the assembly to the position shown in Fig. 2 but before reaching that position the tension on the cables 91 will have been relaxed and the tension on the cables 92 will have again been imposed thereupon to provide the downward thrust upon each of the lift arms 88. This constant downward thrust effectively prevents the lateral assemblies from performing an uneven mowing operation as a result of bouncing caused by the passage of the device over rough terrain at relatively high speeds.

We have provided a multi-rotor mower capable of cutting an extremely wide swathe and of being operated over relatively rough terrain at speeds approximately as high as 25 miles per hour. It can be readily seen that our mower will perfect a 180° turn without any damage whatsoever to the surface being mown, without any excessive wear upon the tires, and without leaving any unmown portions in the area of the point about which the turn is made. Our mower is constructed to eliminate the marked elevational irregularities in the cutting operation which normally results from mowing at high speeds over rough terrain. This of course is accomplished by our dampening mechanism in combination with our depressing mechanism.

It should be noted that we have provided a mower which eliminates a substantial loss of time by obviating any requirement for changing the knives as soon as the conventional single cutting edge is dulled. We have provided cutting elements with two cutting edges and have provided means for reversing the direction of rotation of the cutter elements so that the second group of cutting edges may be used when the first group of cutting edges has become dulled.

It should also be noted that we have provided novel and improved means for preventing the cutter elements from engaging and throwing foreign objects. This substantially reduces the danger of injury to the operator of the device and to bystanders. Any foreign objects engaged by the knife element 72 will be tossed against the depending chains 68 and will thereafter be deflected downwardly to fall harmlessly to the ground. At the same time, these chains 68 permit the grass and weeds to extend upwardly therebetween so as to remain in a relatively upright position at all times prior to the cutting operation. The flexible and separable nature of the plurality of chains effectively prevents any matting of the weeds and grass and consequent raising of the assemblies which might result from the use of a rigid integral guard such as a plate.

It should also be noted that we have completely eliminated any requirement for castored wheels to support the cutter units. Castored wheels, which have been commonly used previously in an attempt to keep skidding at a minimum, are unsatisfactory because they wear excessively when used at high speeds, thereby necessitating frequent replacements and increasing costs of operations substantially. With a sweep-back or sweep-forward arrangement of cutter units, castored wheels are not required and, in fact, are not as satisfactory. A castored wheel, when driven at relatively high speed will "shimmy" violently and will set up extreme vibrations within the entire machine. Such vibrations, of course, are highly undesirable for they increase the wear on the machine parts and prevent it from operating in a satisfactory manner.

Wherever hereinafter the expression "meets the vertical plane" or a similar expression is used with respect to the cutter element orbits and the axis of the ground engaging wheels, it is intended to include structure which conforms substantially with such specification.

It will, of course, be understood that various changes may be made in the form, details, arrangement and proportions of the parts without departing from the scope of our invention.

What we hereby claim is:

1. In a rotary mower having an ambulant frame and at least one rotary cutter unit assembly pivoted adjacent one of its end portions to said frame for upward swinging movement of its opposite end portion, an elevating mechanism for such cutter unit assembly including an extensible and retractable hydraulic cylinder unit pivotally mounted on the frame of the mower and adapted to be connected to a source of hydraulic power and to be controllably extended and retracted when so connected, a substantially horizontal pivot member connected to one end portion of said cylinder unit and movable therewith, mechanism pivotally mounted on said mower frame extending to said pivot member and pivotally supporting the same upon such frame for vertical swinging movement and causing the same to move upwardly as said hydraulic cylinder is retracted, a lever arm pivotally mounted on said pivot member for pivotal movement thereabout and extending laterally of the mower frame, said lever arm being adapted to be pivotally connected to such rotary cutter unit assembly intermediate its end portions, and flexible means extending between said lever arm and said mower frame and limiting the extent of such pivotal movement of said lever arm about said pivot member and causing said lever arm to move upwardly throughout its length with said pivot member when said hydraulic cylinder is retracted and thereby causing said lever arm when so connected to such rotary cutter unit assembly to move the same upwardly therewith to an elevated and out of way position with respect to the rest of mower.

2. In a rotary mower having an ambulant frame and at least one rotary cutter unit assembly pivoted adjacent one of its end portions to said frame, an elevating mechanism for such cutter unit assembly including an extensible and retractable hydraulic cylinder unit pivotally mounted on the frame of the mower and adapted to be connected to a source of hydraulic power and to be controllably extended and retracted when so connected, a substantially horizontal pivot member connected to one end portion of said cylinder unit for movement therewith, a pivot arm pivotally mounted on said mower frame and pivotally supporting said pivot member on the frame of the mower for swinging movement to cause the same to move upwardly as said hydraulic cylinder is retracted, a lever arm pivotally mounted on said pivot member for pivotal movement thereabout, said lever arm being adapted to be pivotally connected to such rotary cutter unit assembly intermediate the end portions of such assembly, and flexible anchor means connecting said lever arm to the frame of the mower and limiting the extent of pivotal movement of said lever arm and causing the same to pivot on said pivot member from a position approximating horizontal to a position approaching vertical when said hydraulic cylinder is retracted and said pivot member is raised to thereby cause such a rotary cutter unit assembly when so connected to said lever arm to be moved upwardly to an elevated and out-of-way position with respect to the rest of the mower.

3. In a rotary mower having an ambulant frame and at least one rotary cutter unit assembly pivoted adjacent one of its end portions to said frame for upward swinging movement of its opposite end portion, an elevating mechanism for such cutter unit assembly including an extensible and retractable hydraulic cylinder unit pivotally mounted on the frame of the mower and adapted to be connected to a source of hydraulic power and to be controllably extended and retracted when so connected, a substantially horizontal pivot member connected to one end portion of said cylinder unit for movement therewith, a pivot arm pivotally connected to the mower frame mounting said pivot member upon the frame of the mower for swinging movement of the same in a vertical plane, said cylinder being positioned with respect to said arm to cause said pivot member to move upwardly when said cylinder is retracted and to move downwardly when said cylinder is extended, a lever arm pivotally mounted by one of its end portions on said pivot member for pivotal movement thereabout, said lever arm having its opposite end portion adapted for pivotal connection with such rotary cutter unit assembly intermediate the end portions of the latter and having a curved surface rigidly connected with said mounted end portion, and flexible anchor means connecting to said lever arm adjacent said pivot member to the frame of the mower and extending around said curved surface to cause said lever arm to pivot on said pivot member and move said opposite end portion in an upward direction when said hydraulic cylinder is retracted to thereby cause such a rotary cutter unit assembly when so connected to said lever arm to be moved upwardly to an elevated and out-of-way position.

4. In a rotary mower having an ambulant frame and at least one rotary cutter unit assembly pivoted adjacent one of its end portions for upward swinging movement of its opposite end portion, an elevating mechanism for such cutter unit assembly including a hydraulic cylinder unit pivotally mounted on the frame of the mower and adapted to be connected with a source of hydraulic power and to be controllably extended to one extreme position and retracted to its other extreme position when so connected, a substantially horizontal pivot member connected to one end portion of said cylinder unit for movement therewith, means for additional mounting of said pivot member for swinging movement of the same in a vertical plane, said cylinder being positioned with respect to said means to cause said pivot member to swing upwardly when said cylinder is moved toward one extreme position and to swing downwardly when said cylinder is moved to its other extreme position, a lever arm mounted by one of its end portions on said pivot member for pivotal movement thereabout, said lever arm having its opposite end portion adapted for pivotal connection with such a rotary cutter unit assembly intermediate the end of the latter and having a curved surface rigidly connected with said mounted end portion, and cable means connected to said curved surface and following the outer contours thereof, one end portion of said cable means being anchored at a position to cause said lever arm to pivot on said pivot member and move said opposite end portion in an upward direction when said pivot member is moved upwardly to thereby cause such a rotary cutter unit assembly when so connected to said lever arm to be moved upwardly to an elevated and out-of-way position.

5. In a rotary mower having an ambulant frame and at least one rotary cutter unit assembly mounted to permit vertical movement of the same and supported in part at least by wheel structure, mechanism for maintaining such wheel structure in contact with the ground at all times despite travel over rough terrain, said mechanism including an arm supported by the frame, a pivot shaft carried by said arm, a lever arm mounted by one of its end portions on said shaft for swinging movement and having its opposite end portion adapted to be rigidly connected with such an assembly, said mounted end portion having a curved surface associated therewith and at least partially surrounding said shaft, a contractile type spring member having one of its ends relatively anchored, and cable structure connecting the free end of said spring with said curved surface and extending at least partially around said surface in a direction to urge said lever arm to swing its opposite end portion downwardly when said spring is tensioned to exert a constant downward pressure on the assembly, said cable structure being of a length to cause said spring to be tensioned when said wheel structure contacts the ground.

6. In a rotary mower having an ambulant frame and at least one vertically movable rotary cutter unit assembly supported in part at least by wheel structure, mechanism for maintaining such wheel structure in contact with the ground at all times despite travel over rough terrain, said mechanism including an arm supported by the frame, a lever arm pivotally mounted on said arm on a substantially horizontal axis by one of its end portions and having its opposite end portion adapted to be rigidly but pivotally connected with such assembly, said mounted end portion of said lever arm having a curved rigid surface connected thereto and extending at least partially around the pivot axis of said lever arm, cable means connected to said curved surface and extending therearound in the direction said lever arm will pivot when such assembly moves downwardly, and resilient means connected to said cable means for urging said lever arm to pivot in the same direction and thus exert a downward pressure upon such assembly.

7. In a rotary mower having an ambulant frame and a pair of vertically movable rotary cutter unit assemblies supported in part at least by wheel structure, mechanism for maintaining such wheel structure in contact with the ground at all times despite travel over rough terrain, said mechanism including a pair of spaced arms supported by the frame, a lever arm pivotally mounted by one of its end portions on each of said arms and having its opposite end portion adapted to be rigidly connected with one of such assemblies, each of said mounted end portions of said lever arms having a curved surface connected thereto and extending at least partially around the pivot axis of the respective lever arm, and a contractile type spring member interposed while under tension between said lever arms and having its respective end portions connected to said curved surfaces at points such as to urge said lever arm to swing its opposite end portion downwardly and thereby exert a downward pressure upon its respective assembly.

8. In a rotary mower having an ambulant frame and a pair of rotary cutter unit assemblies each extending laterally therefrom and being pivoted adjacent one of its end portions for upward swinging movement of its opposite end portion and being supported at least partially by wheel structure mechanism for elevating such assemblies and for maintaining such wheel structure in contact with the ground at all times during mowing operations despite travel over rough terrain, said mechanism including a hydraulic cylinder assembly adapted to be connected with a source of hydraulic power and to be controllably extended and retracted when so connected, a pair of substantially horizontal pivot members connected to the opposite ends of said hydraulic cylinder assembly, a pair of spaced pivot arms supported by the frame adjacent the ends of said cylinder assembly and pivotally mounted for swinging movement in a vertical plane and each carrying one of said pivot members, a pair of lever arms each mounted by one of its end portions on one of said pivot members for swinging vertical movement of its opposite end portion, said opposite end portions being each adapted for rigid but pivotal connection with its respective cutter unit assembly to cause the assembly to be elevated when said pivot arm is raised by the retraction of said hydraulic cylinder, said mounted end portions of said lever arms each having a drum-like structure associated therewith and fixedly connected thereto, a contractile type spring interposed between said drum-like structures, a pair of cables one each connected to each end of said spring and extending around said drum-like structure from below and being connected thereto, said cables each being of such length to impose a tension upon said spring when said hydraulic cylinder unit is extended to cause said cables to urge the opposite end portions of assembly arms to swing downwardly and thereby maintain such wheel structure at all times during mowing operations in contact with the ground.

9. In a rotary mower having an ambulant frame and a rotary cutter unit assembly extending laterally therefrom and being pivoted adjacent one of its end portions for upward swinging movement of its opposite end portion and being supported at least partially by wheel structure, mechanism for elevating such assembly and for mantaining such wheel structure in contact with the ground at all times during mowing operations despite travel over rough terrain, said mechanism including a transversely extending hydraulic cylinder assembly mounted on such frame and adapted to be connected with a source of hydraulic power and to be controllably extended and retracted from one extreme position to its other extreme position when so connected, an arm pivotally mounted by its lower end portion on such frame for swinging movement on a substantially horizontal axis, a pivot shaft carried by the upper end portion of said arm and extending longitudinally of such frame and being connected to one end of said hydraulic cylinder assembly, the other end of said cylinder assembly being relatively fixed, a lever arm pivotally mounted by one of its end portions on said pivot shaft and having its other end portion adapted to be rigidly but pivotally connected to such cutter unit assembly, the relatively fixed end of said cylinder assembly being disposed to cause said arm to extend outwardly from vertical position when said cylinder assembly is extended to its extreme position, said mounted end portion of said lever arm having a curved surface associated therewith and connected thereto and extending at least partially around said pivot shaft, cable means connected to said curved surface and extending therearound in the direction said lever arm will pivot when such assembly moves downwardly, resilient means connected to said cable means for urging said lever arm to pivot in said direction and thus exert a downward pressure upon such assembly, said resilient means being disposed to exert such pressure only while said arm extends outwardly beyond vertical position, and additional cable means connected to said curved surface and extending therearound in the opposite direction from said first mentioned cable means and being anchored outwardly of the pivoted axis of the lower end portion of said first mentioned arm whereby as said cylinder assembly contracts and said arm approaches vertical position, said lever arm will be caused to pivot on said pivot shaft and the opposite end portion will be caused to raise relative rapidly and to thereby elevate said cutter unit assembly.

References Cited in the file of this patent

UNITED STATES PATENTS

| Number | Name | Date |
|---|---|---|
| 1,397,365 | Cook | Nov. 15, 1921 |
| 2,259,553 | Clapper | Oct. 21, 1941 |
| 2,325,870 | Mott | Aug. 3, 1943 |
| 2,485,383 | Hoyt | Oct. 18, 1949 |
| 2,624,999 | Goodnight | Jan. 13, 1953 |